United States Patent [19]

Basnett

[11] Patent Number: 4,712,995
[45] Date of Patent: Dec. 15, 1987

[54] REPLACEABLE ROCKER ARM ASSEMBLY FOR INJECTION MOLDING SYSTEM

[75] Inventor: David T. Basnett, Bramalea, Ontario, Canada

[73] Assignees: Die-Mold Tool Ltd.; Mold-Masters Limited, both of Georgetown, Canada

[21] Appl. No.: 32,549

[22] Filed: Apr. 1, 1987

[30] Foreign Application Priority Data

Mar. 19, 1987 [CA] Canada .................................. 532,489

[51] Int. Cl.⁴ ............................................. B29C 45/23
[52] U.S. Cl. .................................. 425/562; 425/563; 425/564; 425/566
[58] Field of Search ............... 425/562, 563, 564, 568, 425/566

[56] References Cited

U.S. PATENT DOCUMENTS

| 4,013,393 | 3/1977 | Gellert | 425/566 |
| 4,026,518 | 5/1977 | Gellert | 251/330 |
| 4,222,733 | 9/1980 | Gellert et al. | 425/566 |
| 4,468,191 | 8/1984 | Gellert | 425/564 |

*Primary Examiner*—Jay H. Woo
*Assistant Examiner*—Timothy W. Heitbrink
*Attorney, Agent, or Firm*—Riches, McKenzie & Herbert

[57] ABSTRACT

This invention relates to a valve gated injection molding system having an improved rocker arm assembly connected between the valve pin and the actuating mechanism. The rocker arm assembly includes an elongated rocker arm which is pivotally mounted in a groove in a cylindrical support member. The rocker arm assembly is removably received in a bore in the mold bore and the rocker arm is disconnectable from the valve pin, whereby the rocker arm assembly is quickly and easily replaceable without disassembly of the mold.

9 Claims, 5 Drawing Figures

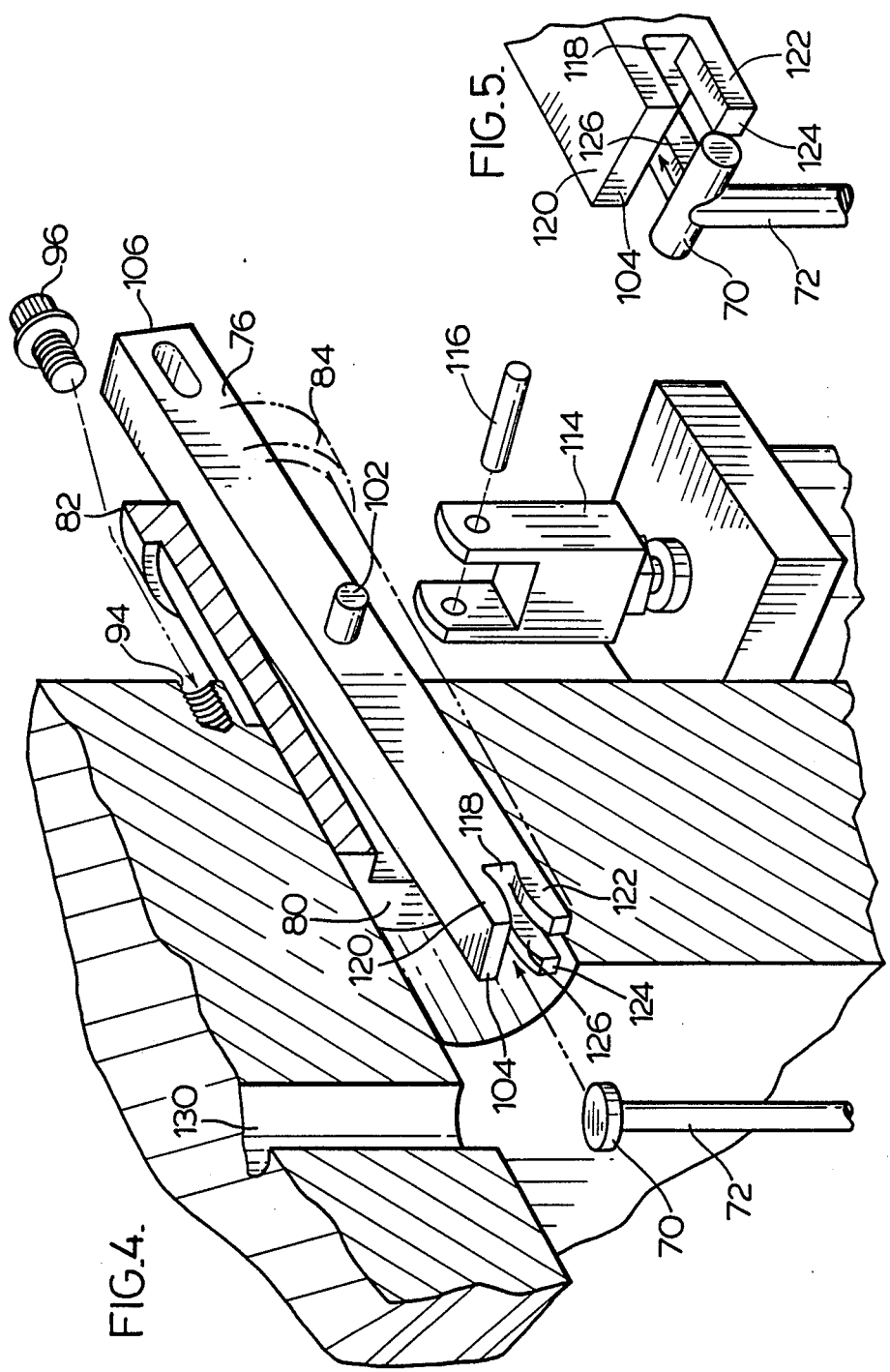

REPLACEABLE ROCKER ARM ASSEMBLY FOR INJECTION MOLDING SYSTEM

BACKGROUND OF THE INVENTION

This invention relates generally to valve gated injection molding, and more particularly to a system having an easily replaceable rocker arm assembly.

In many valve gated injection molding systems, reciprocable actuating mechanism is connected directly to the head of each valve pin. However, in some situations, this arrangement is not convenient or even possible. Therefore, as is well known, a pivotable rocker arm is frequently used to connect the head of the valve pin to remotely located actuating mechanism. Examples of this type of structure are described in U.S. Pat. No. 4,013,393 to Gellert entitled "Valve-Gated Injection Molding Mechanism" which issued Mar. 22, 1977, U.S. Pat. No. 4,026,518 to Gellert entitled "Bushing Seal for Valve-Gated Injection Mold", which issued May 31, 1977 and U.S. Pat. No. 4,222,733 to Mold-Masters Limited entitled "Injection Molding Flow Control Mechanism" which issued Sept. 16, 1980. As mentioned in these patents, it will be appreciated that rocker arm wear due to their repetitive pivotal action is an important factor in providing a system which does not require unacceptable maintenance and down time.

In order to reach the valve pin, the rocker arm is mounted in the mold core or backplate. In these previous systems, in order to repair or replace the rocker arm due to malfunction or routine maintenance, it is necessary to disassemble a portion of the mold. This has the disadvantages of being relatively costly and requiring considerable system down time.

SUMMARY OF THE INVENTION

Accordingly, it is an object of the invention to at least partially overcome the disadvantages of the prior art by providing a system wherein the rocker arm is part of an assembly which is replaceable without taking the mold apart.

To this end, in one of its aspects, the invention provides a valve gated injection molding system having at least one heated nozzle seated in a mold core, the nozzle having a bore in alignment with a gate extending from a melt passage to a cavity, a rocker arm assembly with a pivoted rocker arm having inner and outer elongated ends, an elongated valve pin having a driven end and a tip end, the valve pin extending through the bore of the nozzle with the driven end being operatively connected to the inner end of the rocker arm and the outer end of the rocker arm being operatively connected to valve pin actuating mechanism, whereby the valve pin is reciprocated between a retracted open position and a closed position wherein the tip end of the valve pin is seated in the gate, the improvement wherein, the rocker arm assembly comprises a rocker arm support member and the elongated rocker arm which is pivotally mounted on the support member, the rocker arm assembly being mounted in a bore in the mold core, having an inner and an outer end, the rocker arm being disconnectable from the valve pin and the actuating mechanism, and the rocker arm assembly being removably received through the outer end of the bore, whereby the rocker arm assembly can be replaced without disassembly of the mold.

Further objects and advantages of the invention will appear from the following description taken together with the accompanying drawings.

BRIEF DESCRIPTION OF THE DRAWINGS

FIG. 4 is a cut away isometric view showing how the rocker arm assembly is replaced, and FIG. 5 is an isometric view showing an alternative configuration for the valve pin head.

DETAILED DESCRIPTION OF THE DRAWINGS

Figure 1:
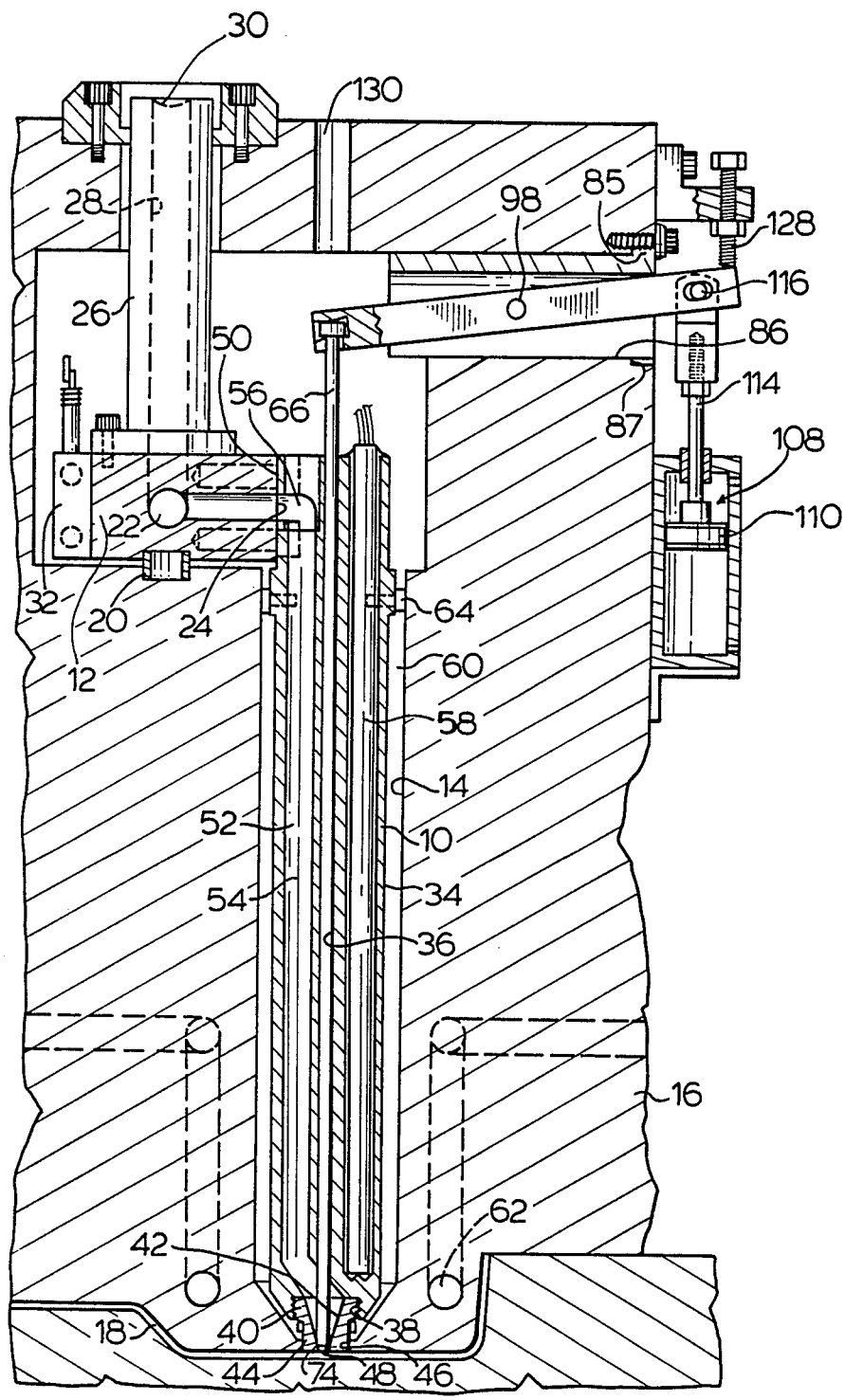
FIG. 1 is a sectional view of a portion of a valve gated injection molding system showing a rocker arm assembly according to a preferred embodiment of the invention.

Reference is first made to FIG. 1 which shows a portion of a valve gated injection molding system having a number of nozzles 10 mounted directly to one side of an elongated manifold 12. The nozzles 10 are each located in a well 14 in the mold core 16 to convey melt from the manifold 12 to a common cavity 18. The manifold 12 is located relative to the mold core 16 by a central locating ring 20 seated between them, and has a longitudinal melt bore 22. The longitudinal melt bore 22 branches out to a number of outlets 24 and extends from a heated melt conveying tube 26 which is bolted to the manifold 12. The melt conveying tube 26 has a central bore 28 to receive pressurized melt from a molding machine (not shown) through a recessed inlet 30. In this embodiment, the manifold 12 is heated to a predetermined temperature by electric plate heater 32 which is bolted to the other side surface of the manifold 12. Each nozzle 10 has a generally cylindrical outer surface 34 and valve pin bore 36 extending centrally therethrough. In this embodiment, the valve pin bore 36 has an enlarged mouth 38 which is threaded to securely receive a tip insert 40. The tip insert 40 has a tapered central bore 42 in alignment with the valve pin bore 36 and a cylindrical nose portion 44 which is received in an opening 46 through the core 16, whereby the central bore 42 of the tip insert 40 forms a gate 48 leading to the cavity 18.

Each nozzle 10 has a side portion 50 which is bolted to the manifold 12, as described in the applicants' Canadian patent application Ser. No. 529,897 entitled "Injection Molding System Having Manifold with Side Mounted Nozzles and Method" filed Feb. 17, 1987. The nozzle 10 has a melt channel 52 with a generally longitudinal portion 54 and a lateral portion 56 which connects to an outlet 24 from the manifold. As can be seen, the longitudinal portion 54 extends parallel to but offset from the central valve pin bore 36.

Each nozzle 10 also has two cartridge heaters 58 to maintain the temperature of the nozzle 10 at a predetermined level. The generally cylindrical outer surface 34 of the nozzle is smaller in diameter than the well 14 to provide an insulative air space 60 between the heated nozzle 10 and the surrounding core 16 which is cooled by cooling water flowing through cooling conduits 62. Locating screws 64 are spaced around the circumference of the nozzle 10 to accurately locate it in the well 14. Thus, the forward end of the nozzle 10 is accurately located by the nose portion 44 of the tip insert 40 received in the opening 46 in the core 16, and the rear end of the nozzle is located by the locating screws 64. Securing the nozzle 10 to the side of the manifold by bolts allows slight lateral movement between them to provide for thermal expansion of the manifold 12 when the system is first heated up.

Figure 2:
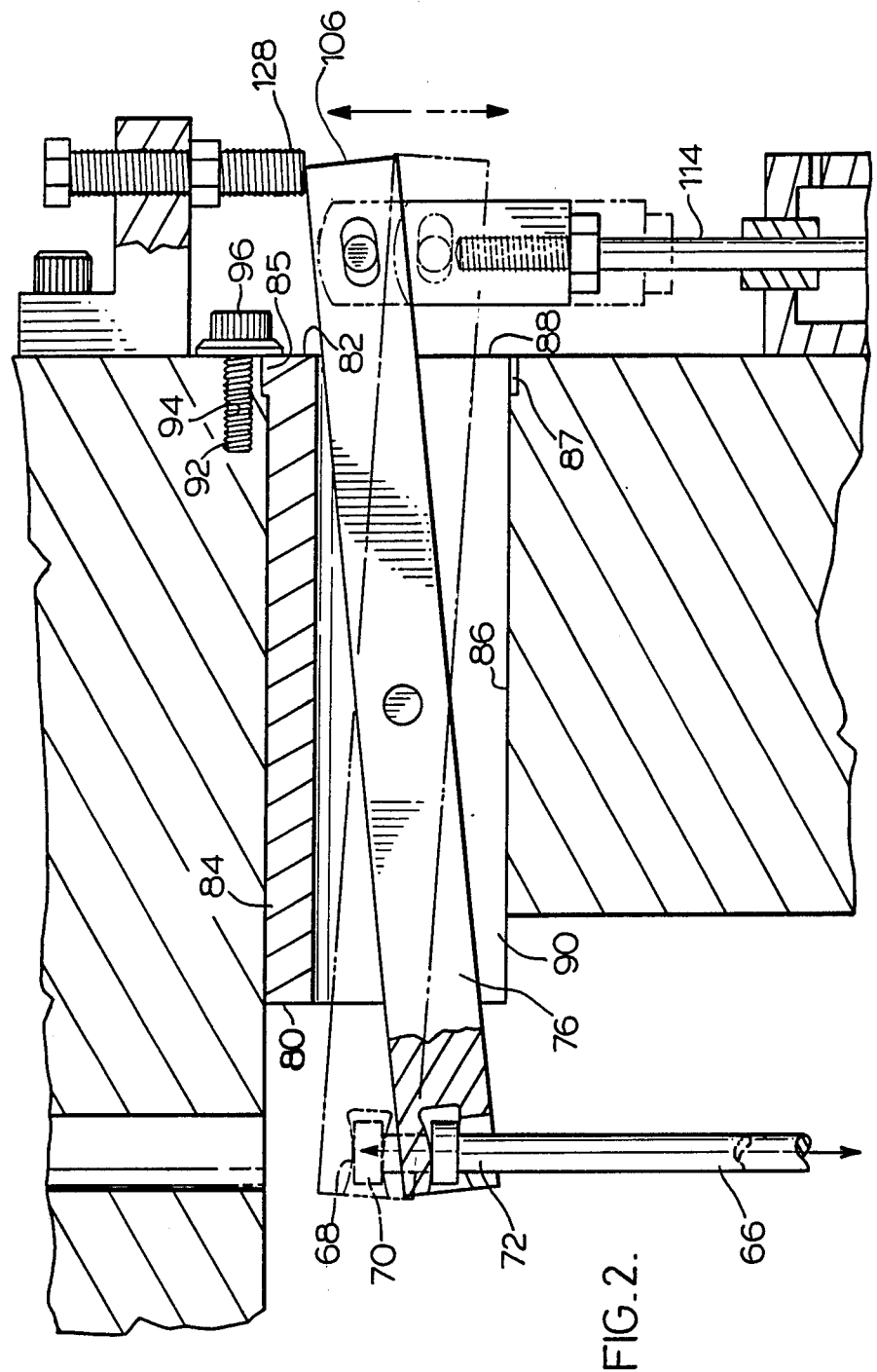
FIG. 2 is a similar enlarged view illustrating the operation of the rocker arm seen in FIG. 1.
Figure 3:
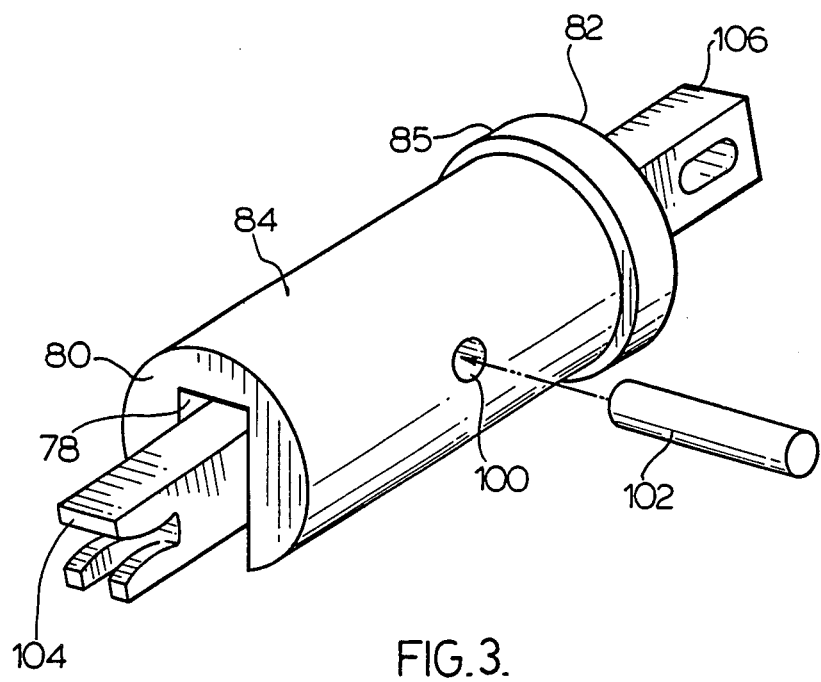
FIG. 3 is an isometric view showing installation of the pivot pin in the rocker arm assembly shown in FIG. 1.

Referring to FIGS. 2–4, the rocker arm assembly according to a preferred embodiment of the invention will now be described. An elongated valve pin 66 is located in the central valve pin bore 36 of each nozzle 10. Each valve pin 66 has a driven end 68 with an enlarged head 70 extending from the stem 72, and a tapered tip end 74. The rocker arm assembly includes a rocker arm 76 which is pivotally mounted in a downwardly open groove 78 which extends between the inner end 80 and the outer end 82 of an elongated cylindrical support housing 84. As can be seen, the housing 84 is made the right size to slide into a cylindrical bore 86 which is drilled through the mold core 16 from an outer end 88 to an inner end 90. The support housing 84 has a collar 85 at its outer end 82 which abuts against a shoulder 87 and, during use, the housing 84 is securely retained in position by a retaining screw 92 which is screwed in a threaded hole 94 in the mold core 16 with a head 96 which engages the outer end 82 of the housing 84. The rocker arm 76 and the support housing 84 each have transverse holes 98,100 which receive a pivot pin 102 which pivotally mounts the rocker arm 76 on the support housing 84. The rocker arm 76 has an inner end 104 which engages the driven end 68 of the valve pin 66 and an outer end 106 which is connected to hydraulic actuating mechanism 108.

The actuating mechanism is of a type well known in the art, similar to that disclosed in U.S. Pat. No. 4,468,191 to Gellert which issued Aug. 28, 1984. It has a piston 110 which reciprocates in a cylinder. The piston 110 has an adjustable length connecting rod 114 which is connected to the outer end 106 of the rocker arm 76 by a removable pin 116. Controlled hydraulic pressure applied to the actuating mechanism on opposite sides of the piston 110 drives the valve pin 66 through the rocker arm 76 between a forward closed position in which the tip end 74 is seated in the gate 48 and a retracted open position.

The inner end 104 of the rocker arm 76 is shaped to engage the head 70 of the valve pin 66 when the actuating mechanism is slid into the operating position in the bore 86, and to disengage it when it is slid out. Thus, in this embodiment, the inner end 104 of the rocker arm 76 has an inwardly open slot 118 which is formed between upper and lower lips 120,122 to receive the enlarged head 70 of the valve pin 66. The lower lip 122 is formed of a pair of spaced fingers 124 which form an inwardly open channel 126 between them to receive the stem 72 of the valve pin 66. Thus, when the actuating mechanism 108 pivots the rocker arm 76 to the closed position, the upper lip 120 bears downwardly on the head 70 of the valve pin to seat the tip end 74 in the gate 48. Conversely, when the hydraulic pressure is reversed, the fingers 124 lift the head 70 to retract the valve pin 66 to the open position. An adjustable stop screw 128 is mounted on the mold core to contact the rocker arm 76 near its outer end 106 and stop it when the tip end 74 of the valve pin 66 is seated in the gate 48. Similarly, the length of the piston connecting rod 114 is adjusted to set the desired travel of the valve pin to the open position. In the preferred embodiment, the support housing 84 is made of steel and the rocker arm 76 is made of a tool steel such as H13 to withstand stress and wear.

In use, electrical power is applied to the plate heater 32 and the cartridge heaters 58 to heat the manifold 12 and the nozzle 10 to a predetermined operating temperature. Pressurized melt is then introduced into the manifold melt bore 22 by a molding machine (not shown) positioned at the recessed central inlet 30. Melt pressure is controlled according to a predetermined cycle in conjunction with the application of controlled hydraulic pressure to the actuating mechanism, in a conventional manner. With each valve pin 66 in the retracted open position, the melt flows through the gate 48 and fills the cavity 18. After the cavity is full, injection pressure is held momentarily to pack and hydraulic pressure is then applied to pivot the rocker arm 76 to drive the valve pin 66 to the forward closed position with the tip end 74 of the valve pin 66 seated in the gate 48. The injection pressure is then released and this position is held for a short cooling period before the mold is opened for ejection. After ejection, the mold is closed and hydraulic pressure reapplied to pivot the rocker arm 76 to draw the valve pin 66 to the retracted open position. Melt injection pressure is reapplied to refill the cavity, and the molding cycle is repeated continuously in a uniform cycle, depending on the size and shape of the cavity and the type of material being molded.

As shown in FIG. 4, if the rocker arm assembly malfunctions or becomes worn, it can quickly and easily be replaced. First, the retaining screw 92 and the connecting rod pin 116 are removed. Then the rocker arm 76 and the support housing 84 are together withdrawn out of the cylindrical bore 86 through the outer end 90. As may be seen, this disengages the inner end 104 of the rocker arm 76 from the head 70 of the valve pin 66. If necessary, the valve pin can then also be removed through an aligned access opening 130 drilled in the mold core 16. If it is necessary to replace only the rocker arm 76 or the support housing 84, they can easily be separated by removing the pivot pin 102. When the rocker arm assembly has been repaired or replaced, it is inserted back into the bore 86 through the outer end 88. The inner end 104 receives the head 70 in the slot 118 to securely engage it to the driven end of the valve pin 66. The retaining screw 92 and connecting rod pin 116 are replaced and the stop screw adjusted if necessary and operation is resumed.

FIG. 5 illustrates a slightly modified embodiment of the invention in which the head 70 of the enlarged valve pin 66 is rod-shaped. However, it is received in the slot 118 between the upper and lower lips 120,122 of the inner end 104 of the rocker arm as previously described. Otherwise, the system and its operation is the same as that described above and need not be repeated.

While the description of the system has been given with respect to preferred embodiments, it is not to be construed in a limiting sense. Variations and modifications will occur to those skilled in the art. For example, the system can have various mold configurations and the rocker arm assembly can be mounted in a back plate or similar mold component. The actuating mechanism 108 can be pneumatically actuated and can be mounted in a variety of arrangements. Similarly, the rocker arm support housing or member 108 can have various structures which pivotally support the rocker arm 76 and is removably received in the bore 86. Reference is made to the appended claims for a definition of the invention.

What I claim is:

1. In a valve gated injection molding system having at least one heated nozzle seated in a mold core, the nozzle having a bore in alignment with a gate extending from a melt passage to a cavity, a rocker arm assembly with a pivoted rocker arm, said rocker arm having inner and outer elongated ends, an elongated valve pin having a driven end and a tip end, the valve pin extending through the bore of the nozzle with the driven end being operatively connected to the inner end of the rocker arm and the outer end of the rocker arm being operatively connected to a valve pin actuating mechanism, whereby the valve pin is reciprocated between a retracted open position and a closed position wherein the tip end of the valve pin is seated in the gate, the improvement wherein;

the rocker arm assembly comprises a rocker arm support member and the elongated rocker arm being pivotally mounted on the support member, the rocker arm asssembly being mounted in a bore in the mold, said bore having an inner and an outer end, the rocker arm being disconnectable from the valve pin and the actuating mechanism, and the rocker arm assembly being removably received through the outer end of the bore, whereby the rocker arm assembly can be replaced without disassembly of the mold.

2. An injection molding system as claimed in claim 1 wherein the support member comprises an elongated cylindrical housing which fits in the bore in the mold core, the housing having a longitudinally extending groove which pivotally receives the rocker arm therein.

3. An injection molding system as claimed in claim 2 wherein the housing and the rocker arm have matching transverse holes therein to receive a pivot pin therebetween, whereby the rocker arm is pivotally mounted in the groove in the housing.

4. An injection molding system as claimed in claim 3 wherein the groove in the housing opens downwardly.

5. An injection molding system as claimed in claim 4 wherein the driven end of the valve pin has an enlarged head extending from a smaller stem, and the inner end of the rocker arm has an inwardly open slot extending between upper and lower lips, the lower lip having a pair of spaced fingers defining an inwardly open channel therebetween, whereby when the rocker arm assembly slides into the bore in the mold core, the inner end of the rocker arm removably engages the driven end of the valve pin by receiving the enlarged head of the valve pin in the slot with the stem extending downwardly through the channel between the fingers.

6. An injection molding system as claimed in claim 5 wherein the outer end of the rocker arm projects from the bore and is connected to the actuating mechanism by a removable pin.

7. An injection molding system as claimed in claim 2, wherein retaining means are provided to securely retain the rocker arm assembly in position in the bore.

8. An injection molding system as claimed in claim 2, wherein adjustable stop means are mounted on the mold core to contact the outer end of the rocker arm to limit the travel of the valve pin.

9. An injection molding system as claimed in claim 2, wherein the actuating mechanism is hydraulically actuated.

* * * * *